(12) United States Patent
Hashimoto et al.

(10) Patent No.: US 11,551,869 B2
(45) Date of Patent: Jan. 10, 2023

(54) MULTILAYER ELECTRONIC COMPONENT

(71) Applicant: Murata Manufacturing Co., Ltd., Nagaokakyo (JP)

(72) Inventors: Hideyuki Hashimoto, Nagaokakyo (JP); Kenji Ueno, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 0 days.

(21) Appl. No.: 16/909,097

(22) Filed: Jun. 23, 2020

(65) Prior Publication Data

US 2020/0411241 A1 Dec. 31, 2020

(30) Foreign Application Priority Data

Jun. 28, 2019 (JP) .............................. JP2019-121512
May 22, 2020 (JP) .............................. JP2020-089480

(51) Int. Cl.
*H01G 4/008* (2006.01)
*H01G 4/12* (2006.01)
*H01G 4/30* (2006.01)

(52) U.S. Cl.
CPC ......... H01G 4/1227 (2013.01); H01G 4/0085 (2013.01); *H01G 4/30* (2013.01)

(58) Field of Classification Search
CPC ...... H01G 4/0085; H01G 4/12; H01G 4/1227; H01G 4/30; H01G 4/008; H01G 4/00
USPC ......... 361/301.4, 306.3, 321.2, 321.5, 321.4; 174/260
See application file for complete search history.

(56) References Cited

U.S. PATENT DOCUMENTS

| | | |
|---|---|---|
| 3,920,781 A | 11/1975 | Eror et al. |
| 9,287,046 B2 | 3/2016 | Morita et al. |
| 10,147,546 B2 | 12/2018 | Morita et al. |
| 2004/0233612 A1 | 11/2004 | Sugimoto et al. |
| 2009/0086407 A1 | 4/2009 | Takahashi et al. |
| 2009/0219666 A1 | 9/2009 | Fukuda |
| 2009/0225494 A1 | 9/2009 | Yamazaki |
| 2010/0014214 A1* | 1/2010 | Yamazaki ............... B32B 18/00 501/137 |
| 2010/0188797 A1 | 7/2010 | Yamazaki et al. |
| 2012/0250221 A1 | 10/2012 | Yamashita |

(Continued)

FOREIGN PATENT DOCUMENTS

| | | |
|---|---|---|
| CN | 1634800 A | 7/2005 |
| CN | 101765894 A | 6/2010 |

(Continued)

OTHER PUBLICATIONS

BariumTitanate_pp. 49 to 104_1999.*

(Continued)

*Primary Examiner* — Timothy J Thompson
*Assistant Examiner* — Guillermo J Egoavil
(74) *Attorney, Agent, or Firm* — ArentFox Schiff LLP

(57) ABSTRACT

A multilayer electronic component that includes a plurality of stacked dielectric layers, each of the plurality of stacked dielectric layers having a plurality of crystal grains, at least some of the plurality of crystal grains having a trap portion therein, and at least one element selected from the group consisting of Ni, Cu, Pt, Sn, Pd and Ag is present locally in the trap portion; and a plurality of internal electrode layers arranged between adjacent dielectric layers of the plurality of stacked dielectric layers.

8 Claims, 7 Drawing Sheets

(56) References Cited

U.S. PATENT DOCUMENTS

| | | | |
|---|---|---|---|
| 2013/0094121 A1 | 4/2013 | Endo et al. | |
| 2015/0036264 A1 | 2/2015 | Morita | |
| 2016/0217924 A1* | 7/2016 | Morita | C04B 35/4682 |
| 2017/0365410 A1* | 12/2017 | Morita | H01G 4/1227 |
| 2018/0182557 A1* | 6/2018 | Park | H01L 28/40 |
| 2018/0294098 A1 | 10/2018 | Inoue | |
| 2019/0051460 A1 | 2/2019 | Kawamura | |
| 2019/0198245 A1 | 6/2019 | Sanner et al. | |
| 2019/0233948 A1* | 8/2019 | Wang | C23C 24/10 |
| 2019/0272954 A1 | 9/2019 | Ariga et al. | |
| 2020/0043665 A1 | 2/2020 | Park | |
| 2020/0090865 A1 | 3/2020 | Kim et al. | |
| 2020/0258684 A1* | 8/2020 | Yun | H01G 4/1209 |

FOREIGN PATENT DOCUMENTS

| | | | | |
|---|---|---|---|---|
| CN | 103553591 A | * | 2/2014 | C04B 35/468 |
| JP | 2003142331 A | | 5/2003 | |
| JP | 2005029423 A | | 2/2005 | |
| JP | 2008109120 A | | 5/2008 | |
| JP | 2013157460 A | | 8/2013 | |
| JP | 2013229551 A | | 11/2013 | |
| JP | 2017228590 A | | 12/2017 | |
| JP | 2018181940 A | | 11/2018 | |
| KR | 1020090011028 A | | 1/2009 | |
| KR | 1020090033099 A | | 4/2009 | |
| KR | 20120080657 A | | 7/2012 | |
| KR | 20130040708 A | | 4/2013 | |

OTHER PUBLICATIONS

Coating BaTiO3 Nanolayers on Spherical Ni Powders for Multilayer Ceramic Capacitors_Lee et al._pp. 1655-1658_Oct. 2003.*
BariumTitanate_pp. 49 to 104_Sep. 2007.*
Coating BaTiO3 Nanolayers on Spherical Ni Powders for MLCC_Lee et al._pp. 1655-1658_Oct. 2003.*
Interfacial Diffusion Behavior In Ni—BaTiO3 MLCCs_Gong et al._pp. 419-421_Mar. 2014.*
Synthesis & Characterization of BaTiO3 by Doping_Li et al._pp. 9522-9528_Oct. 2015.*
Thermally Stimulated BaTiO3 Crystal_Wu et al._045005-1 to 045005-6_Apr. 2018.*
Topology of Ferroelectric Polarization BaTiO3 (001) Surface _Dionet_ pp. 1-154_Dec. 2015.*
Trapping Oxygen Vacancy at Grain Boundary_Oyama et al._pp. 134107-1 to 134107-10_2010.*
Chinese Office Action issued for Chinese Application No. 202010583658.5, dated Aug. 4, 2021.
Korean Office Action issued for Korean Application No. 10-2020-0075437, date of dispatch Nov. 24, 2021.
Korean Office Action issued for Korean Application No. 10-2020-0076266, date of dispatch Nov. 24, 2021.
Korean Office Action issued for Korean Application No. 10-2020-0072713, date of dispatch Nov. 3, 2021.
Definition-of-divalent-cation_Helmenstine_1 page_May 2019.
Rare Earth Elements Ionic Radius_Shannon_p. 1_1976.
Structure & Dielectric Properties of Perovskite BaTiO3_Hsiao-Lin_ pp. 1-15_Dec. 2002.

* cited by examiner

MULTILAYER ELECTRONIC COMPONENT

CROSS REFERENCE TO RELATED APPLICATIONS

The present application claims priority to Japanese Patent Application No. 2019-121512, filed Jun. 28, 2019, and claims priority to Japanese Patent Application No. 2020-089480, filed May 22, 2020, the entire contents of each of which are incorporated herein by reference.

BACKGROUND OF THE INVENTION

Field of the Invention

The present disclosure relates to a multilayer electronic component.

Description of the Background Art

In recent years, a multilayer electronic component such as a multilayer ceramic capacitor has been increasingly applied to an electronic device such as a vehicle-mounted device that requires high reliability. The reliability of the multilayer electronic component can be evaluated based on, for example, the length of time (hereinafter, also simply referred to as "lifetime") required for insulation resistance to decrease to a predetermined value in a high temperature load test.

As an example of the multilayer electronic component, there is a multilayer ceramic capacitor described in Japanese Patent Laying-open No. 2017-228590. The multilayer ceramic capacitor described in Japanese Patent Laying-Open No. 2017-228590 includes a dielectric layer including a ceramic material and nickel (Ni), and an internal electrode layer including Ni.

When a high electric field is applied to a dielectric layer of a multilayer ceramic capacitor, as in a high temperature load test, the multilayer ceramic capacitor tends to have insulation resistance dominated by grain boundaries of crystal grains forming the dielectric layer. Japanese Patent Laying-Open No. 2017-228590 discloses a technique to suppress variation in insulation resistance by incorporating into crystal grains Ni having diffused from the internal electrode layer and present locally at grain boundaries.

SUMMARY OF THE INVENTION

Japanese Patent Laying-Open No. 2017-228590 is silent on a structure for incorporating Ni present locally at grain boundaries into crystal grains and retaining it in the crystal grains. An object of the present disclosure is to provide a multilayer electronic component that can have high reliability.

A multilayer electronic component according to the present disclosure comprises a plurality of stacked dielectric layers and a plurality of internal electrode layers arranged between adjacent dielectric layers of the plurality of stacked dielectric layers. The plurality of dielectric layers have a plurality of crystal grains, at least some of the plurality of crystal grains have a trap portion therein, and at least one element selected from the group consisting of Ni, Cu, Pt, Sn, Pd and Ag is present locally in the trap portion.

The multilayer electronic component according to the present disclosure can have high reliability.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
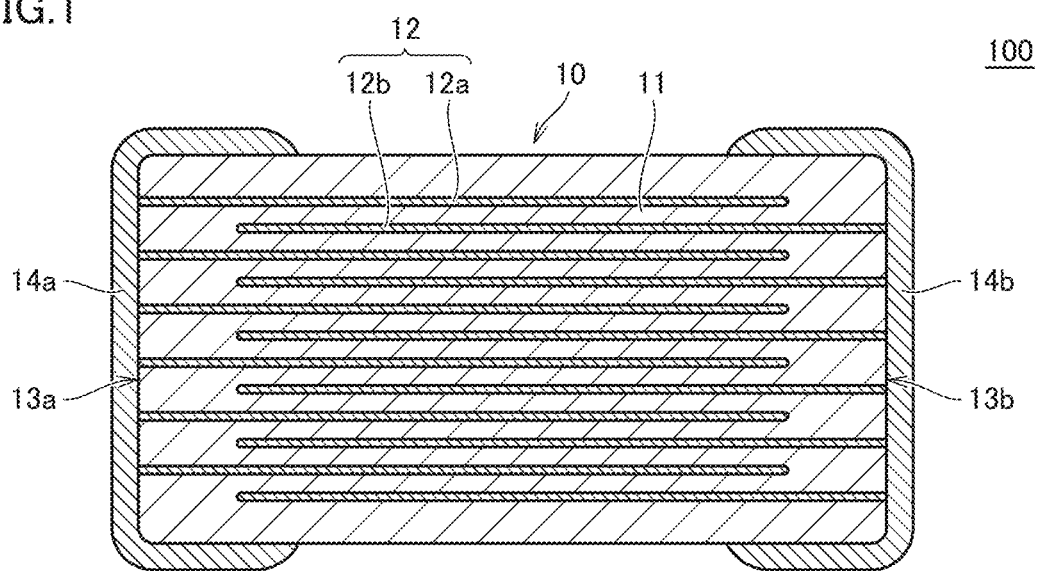
FIG. 1 is a cross section of an example of a multilayer ceramic capacitor which is an embodiment of a multilayer electronic component according to the present disclosure.

Features of the present disclosure will be described with reference to the drawings. In an embodiment of a multilayer electronic component described below, identical or common components are denoted in the figures with the same reference numerals and may not be repeatedly described.

A multilayer ceramic capacitor which is an embodiment of a multilayer electronic component according to the present disclosure will be described with reference to FIGS. 1 to 7.

<Structure of Multilayer Ceramic Capacitor>

FIG. 1 is a cross-sectional view of a multilayer ceramic capacitor 100. Multilayer ceramic capacitor 100 includes a multilayer body 10. Multilayer body 10 has a first major surface and a second major surface that face each other in a layer stacking direction, a first side surface and a second side surface that face each other in a widthwise direction orthogonal to the layer stacking direction, and a first end surface 13a and a second end surface 13b that face each other in a lengthwise direction orthogonal to the layer stacking direction and the widthwise direction.

Multilayer body 10 includes a plurality of stacked dielectric layers 11 and a plurality of internal electrode layers 12. The plurality of dielectric layers 11 have outer layer portions and an inner layer portion. The outer layer portions are arranged between the first major surface of multilayer body 10 and internal electrode layer 12 closest to the first major surface and between the second major surface and internal electrode layer 12 closest to the second major surface. The inner layer portion is arranged in a region sandwiched between these two outer layer portions.

The plurality of dielectric layers 11 are layers composed of a dielectric material. It is preferable that the plurality of dielectric layers 11 each include at least one element selected from the group consisting of Ba, Ti, Ca, Sr, and Zn. The plurality of dielectric layers 11 each have a plurality of crystal grains including a perovskite type compound composed with Ba included therein for example. An example of the perovskite-type compound is for example a perovskite type compound with $BaTiO_3$ as a basic structure.

Each of the plurality of internal electrode layers 12 has a first internal electrode layer 12a and a second internal electrode layer 12b. First internal electrode layer 12a includes an electrode facing portion that faces second internal electrode layer 12b with dielectric layer 11 being interposed, and a lead electrode portion extending from the electrode facing portion to first end surface 13a of multilayer body 10. Second internal electrode layer 12b includes an electrode facing portion that faces first internal electrode layer 12a with dielectric layer 11 being interposed, and a lead electrode portion extending from the electrode facing portion to second end surface 13b of multilayer body 10.

First internal electrode layer 12a and second internal electrode layer 12b face each other with dielectric layer 11 being interposed therebetween, to thereby form a capacitor. Multilayer ceramic capacitor 100 can be described as the one formed by connecting a plurality of capacitors in parallel through a first external electrode 14a and a second external electrode 14b described below.

Internal electrode layer 12 includes an electrically conductive material. Examples of the electrically conductive material for internal electrode layer 12 include at least one type of metal selected from Ni, Cu, Pt, Sn, Pd, Ag and the like, or an alloy including the metal. Internal electrode layer 12 may further include dielectric particles called "co-material" as described below. The co-material is added to bring the sintering shrinkability of internal electrode layer 12 closer to the sintering shrinkability of dielectric layer 11 during sintering of multilayer body 10, and a material therefor is not particularly limited as long as it provides the above-mentioned effect.

Multilayer ceramic capacitor 100 further includes first external electrode 14a and second external electrode 14b. First external electrode 14a is formed on first end surface 13a of multilayer body 10 so as to be electrically connected to first internal electrode layers 12a. First external electrode 14a extends from first end surface 13a to the first and second major surfaces and the first and second side surfaces. Second external electrode 14b is formed on second end surface 13b of multilayer body 10 so as to be electrically connected to second internal electrode layers 12b. Second external electrode 14b extends from second end surface 13b to the first and second major surfaces and the first and second side surfaces.

Each of first external electrode 14a and second external electrode 14b has, for example, an underlying electrode layer and a plating layer arranged on the underlying electrode layer. The underlying electrode layer includes, for example, at least one layer selected from a sintered material layer, an electrically conductive resin layer and a thin film metal layer.

The sintered material layer is formed by baking a paste including a glass powder and a metal powder, and includes a glass portion and a metal portion. Examples of glass that constitutes the glass portion include $B_2O_3$—$SiO_2$—BaO-based glass and the like. Examples of metal that constitutes the metal portion include at least one type of metal selected from Ni, Cu, Ag and the like, or an alloy including the metal. A plurality of sintered material layers having different components may be formed. In a manufacturing method described below, the sintered material layer may be fired simultaneously with multilayer body 10, or may be baked after multilayer body 10 is fired.

The electrically conductive resin layer includes, for example, electrically conductive particles such as fine metal particles, and a resin portion. Examples of metal that constitutes the fine metal particles include at least one type of metal selected from Ni, Cu, Ag and the like, or an alloy including the metal. Examples of resin that constitutes the resin portion include an epoxy-based thermosetting resin and the like. A plurality of electrically conductive resin layers having different components may be formed.

The thin film metal layer is formed by, for example, a thin film forming method such as sputtering or vapor deposition, and is a layer having a thickness of not more than 1 μm and having fine metal particles deposited thereon. Examples of metal that constitutes the thin film metal layer include at least one type of metal selected from Ni, Cu, Ag, Au and the like, or an alloy including the metal. A plurality of thin film metal layers having different components may be formed.

Examples of metal that constitutes the plating layer include at least one type of metal selected from Ni, Cu, Ag, Au, Sn and the like, and an alloy including the metal. A plurality of plating layers having different components may be formed. The plating layer is preferably composed of a Ni-plating layer and a Sn-plating layer. The Ni-plating layer can prevent the underlying electrode layer from being eroded by solder when the multilayer electronic component is mounted. The Sn-plating layer has good wettability to solder including Sn, and can improve the mountability when the multilayer electronic component is mounted.

Each of first external electrode 14a and second external electrode 14b may be a plating layer directly provided on multilayer body 10 and directly connected to the above-described corresponding internal electrode layers. The plating layer preferably includes a first plating layer and a second plating layer provided on the first plating layer.

Examples of metal that constitutes the first plating layer and the second plating layer include at least one type of metal selected from Cu, Ni, Sn, Au, Ag, Pd, Zn and the like, or an alloy including the metal. For example, when Ni is used as the metal that constitutes internal electrode layers 12, Cu having good bondability to Ni is preferably used as the metal that constitutes the first plating layer. When Sn or the like is used as the metal that constitutes internal electrode layers 12, a metal having solder barrier performance is preferably used as the metal that constitutes the first plating layer. In addition, Ni having good wettability to solder is preferably used as the metal that constitutes the second plating layer.

<Fine Structure of Dielectric Layer>

To investigate a fine structure of crystal grains that dielectric layer 11 of multilayer ceramic capacitor 100 according to the present disclosure includes, an HRTEM observation and elemental mapping through an EDX accompanying the HRTEM were performed. In this investigation, a dielectric material which included $BaTiO_3$ as a basic structure of a perovskite type compound and had a variety of additives added thereto was used for dielectric layer 11.

Figure 2:
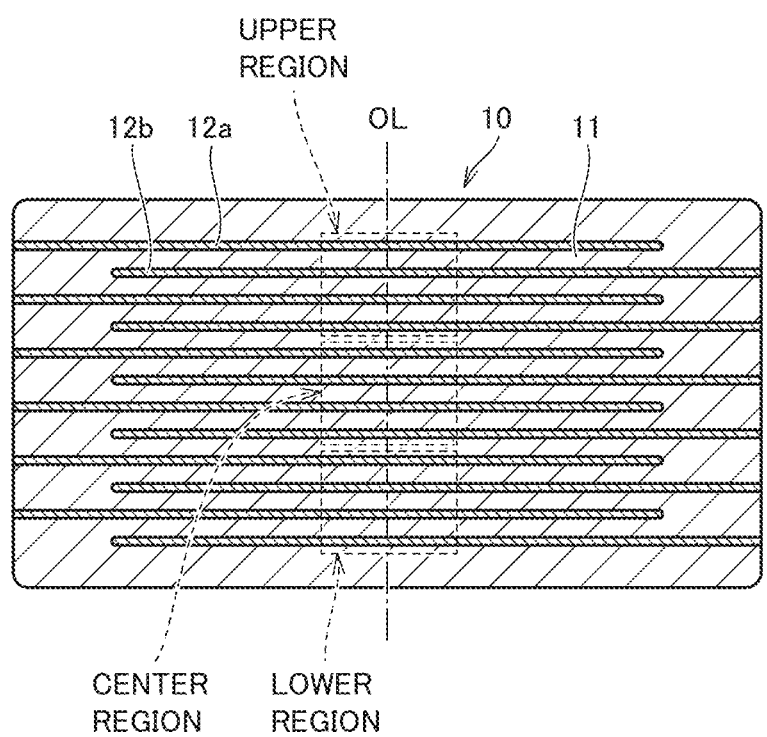
FIG. 2 is a cross section for illustrating a sample prepared for investigating a fine structure of crystal grains in a dielectric layer of the multilayer ceramic capacitor shown in FIG. 1.

Sample production for HRTEM observation and EDX mapping will be described with reference to FIG. 2. FIG. 2 is a cross-sectional view for illustrating a sample prepared to examine the fine structure of the crystal grains in dielectric layer 11 of multilayer ceramic capacitor 100.

A multilayer body 10 for multilayer ceramic capacitor 100 was obtained in a manufacturing method described hereinafter. Dielectric layer 11 in multilayer body 10 used in this investigation includes a perovskite type compound having $BaTiO_3$ as a basic structure. Further, internal electrode layer 12 includes Ni.

Multilayer body 10 was polished from the first side surface side and the second side surface side such that a center portion of multilayer body 10 in the widthwise direction was left, to thereby obtain a polished body. As shown in FIG. 2, an imaginary line OL orthogonal to internal electrode layers 12 was assumed in the vicinity of a center portion in the lengthwise direction. Then, for obtaining an electrostatic capacitance of the polished body, a region including a stack of dielectric layers 11, first internal electrode layers 12a and second internal electrode layers 12b was divided into three equal parts, i.e., an upper region, a center region and a lower region, in the layer stacking direction along imaginary line OL. In FIG. 2, the upper region, the center region and the lower region are shown by a broken line.

The upper region, the center region and the lower region were cut out of the polished body and thinned, to thereby obtain three thin film samples of the respective regions. Each of the three thin film samples includes dielectric layer 11. The three thin film samples of the upper region, the center region and the lower region of multilayer body 10 obtained as described above were subjected to HRTEM observation and elemental mapping by the EDX attached to the HRTEM.

Figure 3:
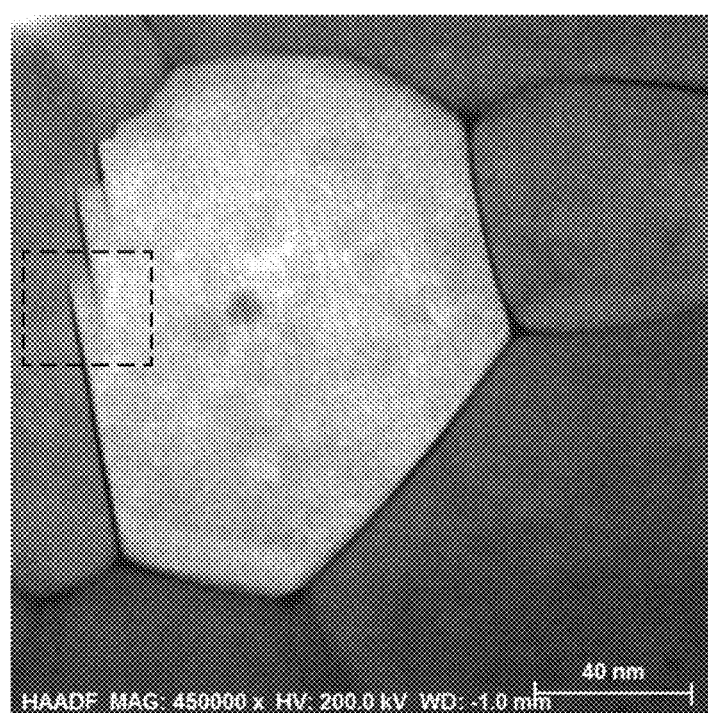
FIG. 3 is an image of the dielectric layer at a center region shown in FIG. 2, as observed with a high resolution transmission electron microscope (hereinafter, also abbreviated as HRTEM).
Figure 4:
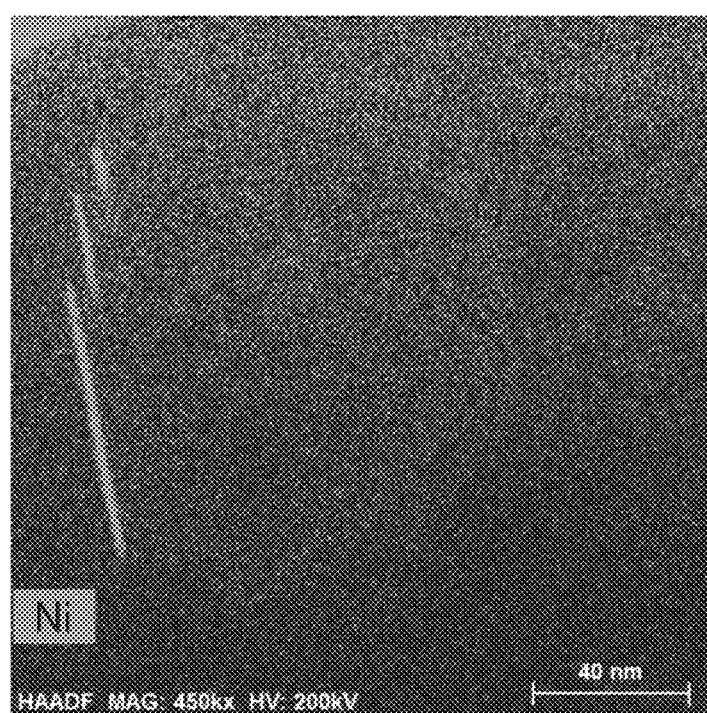
FIG. 4 is a mapping image of Ni in a region shown in FIG. 3 through an energy dispersive X-ray analysis (hereinafter also abbreviated as EDX).
Figure 5:
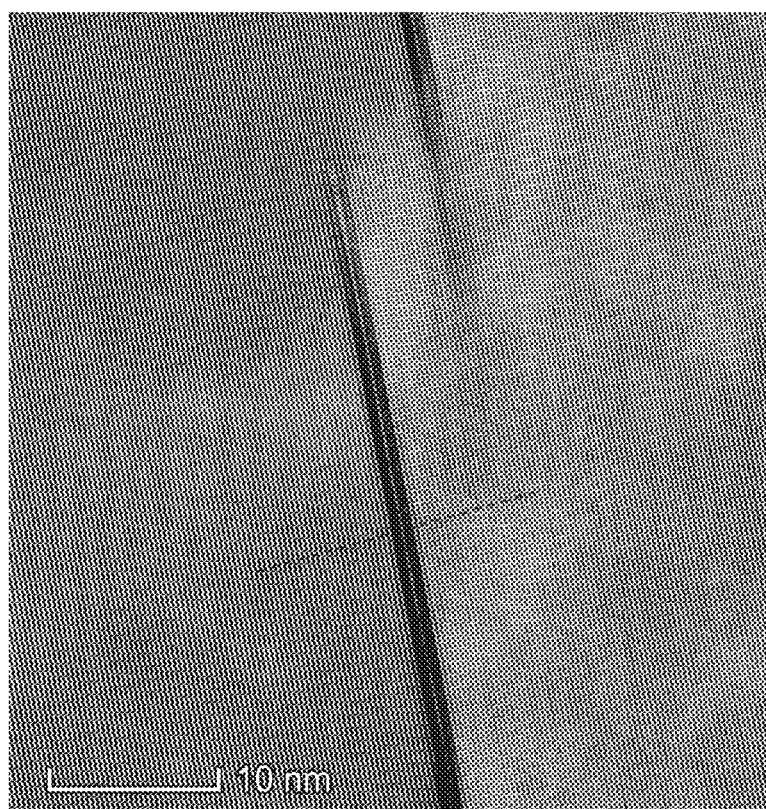
FIG. 5 is an HRTEM observed image which enlarges a region shown in FIG. 3 and surround by a broken line.

The HRTEM observation and the EDX elemental mapping result are shown in FIGS. 3 to 5. FIG. 3 is an image of the dielectric layer at a center region shown in FIG. 2, as observed with the HRTEM. FIG. 4 is a mapping image of Ni in a region shown in FIG. 3 through the EDX. FIG. 5 is an HRTEM observed image which enlarges a region shown in FIG. 3 and surround by a broken line. Note that the HRTEM observation image and the EDX elemental mapping image may not be of a magnification allowing 20 or more crystal grains to be accommodated in one field of view. Further, the HRTEM observation and the EDX elemental mapping may be based on images taken in a plurality of fields of view. In that case, each image can have a region in a range of 1 µm or less×1 µm or less.

The HRTEM observation image and the EDX mapping image did not have any significant difference among the upper region, the lower region and the center region. Therefore, a result obtained from the center region described below is regarded as a fine structure of crystal grains included by dielectric layer 11 of multilayer ceramic capacitor 100 according to the present disclosure.

Dielectric layer 11 has a thickness of about 1.5 µm and an average grain diameter of the crystal grains obtained as an average value of an equivalent circular diameter by image analysis is about 0.13 µm. A grain boundary GB of a crystal grain G was visually determined from the HRTEM observation image.

As shown in FIG. 3, some of the plurality of crystal grains G have a plurality of linear portions therein. It can be seen from FIG. 4 that crystal grain G having a plurality of linear portions includes Ni, and that the Ni is present locally in these linear portions. It is inferred that the Ni originally included in internal electrode layer 12 and diffused therefrom. That is, these linear portions function to trap Ni diffused from internal electrode layer 12 and take it into crystal grain G. Therefore, these linear portions can be said to be a trap portion TP in crystal grain G. The linear trap portion is defined to have a length of 20 nm or more in the longitudinal direction.

Further, as shown in FIG. 5, it has been confirmed that there is no change in a lattice image on the left and right of trap portion TP and trap portion TP is not a grain boundary GB of two different crystal grains G. That is, trap portion TP is a site in a crystal grain G that has changed in crystallinity, and as an electron beam is diffracted there, trap portion TP appears as a linear portion in the HRTEM observed image. It has also been confirmed that the site that has changed in crystallinity is parallel to a line seen in the lattice image. The line that is seen in the lattice image represents one of crystal planes, and it is inferred that the site that has changed in crystallinity includes a plane defect parallel to that crystal plane in crystal grain G.

As shown in FIG. 3, there are a plurality of plane defects in crystal grain G. Herein let us consider an imaginary plane that intersects each of the plurality of plane defects. In this investigation, the imaginary plane can be a plane of observation with the HRTEM (a plane represented as FIG. 3). Lines formed by the imaginary plane intersecting with the plurality of plane defects are parallel to one another. That is, in the plane of observation with the HRTEM, the plurality of plane defects appear as linear portions parallel to one another.

Since the plurality of plane defects are parallel to one another, they are generated with some regularity. That is, it is inferred that the plurality of plane defects require low energy for existing in the above crystal plane, and are stable and easily exist. The plane defects can exist more stably when they are adjacent and paired. This can also be understood from the fact that a plane defect that appears in FIG. 3 as a single line is confirmed as two adjacent plane defects in FIG. 5.

Figure 6:
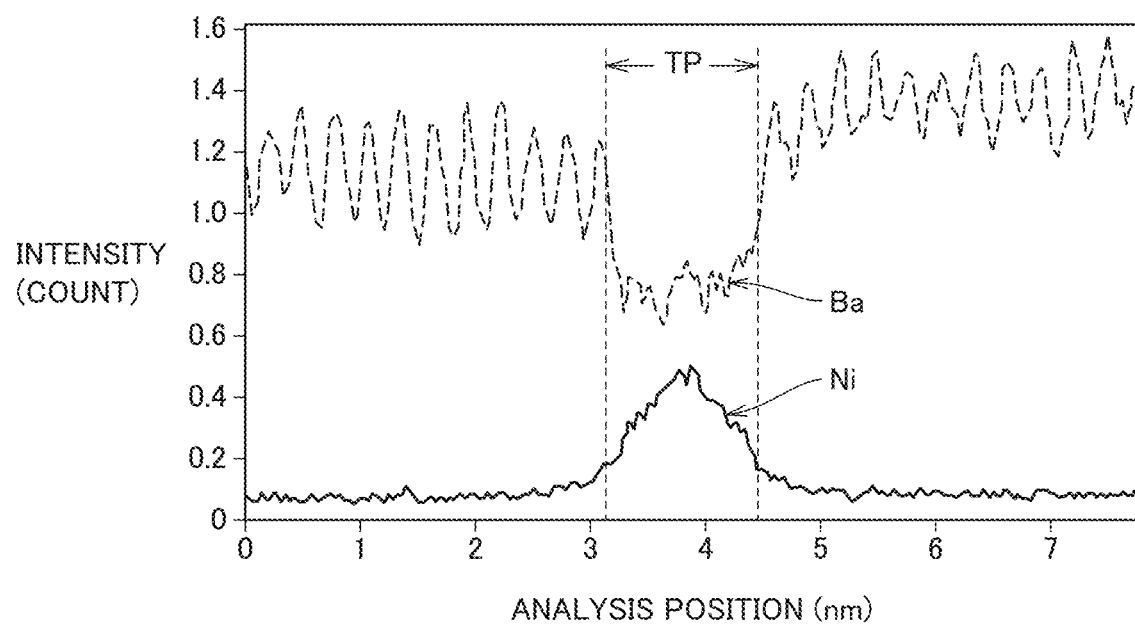
FIG. 6 is a result of a line analysis of Ni and Ba through an EDX in an analysis region indicated in FIG. 5 by a broken line.

FIG. 6 shows a result of a further investigation on the structure of trap portion TP. FIG. 6 shows a result of a line analysis of Ni and Ba through an EDX in an analysis region indicated in FIG. 5 by a broken line, that is, in a vicinity of trap portion TP. The result of the line analysis shown in FIG. 6 also shows that Ni is present locally in trap portion TP. Further, it can be seen that trap portion TP has a smaller amount of Ba than a portion other than trap portion TP.

Figure 7:
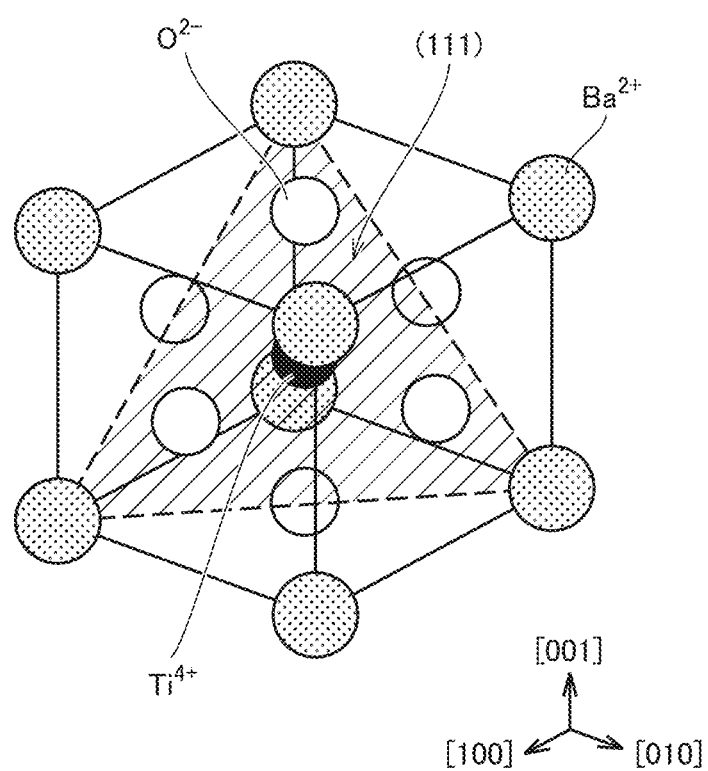
FIG. 7 is a schematic diagram of a crystal structure of $BaTiO_3$.

A schematic diagram of a crystal structure of $BaTiO_3$ is shown in FIG. 7. As has been discussed above, there is a difference in amount of Ba between trap portion TP and other portions. That is, it is inferred that trap portion TP is a defect of a plane composed of Ba' in a perovskite type compound having as a basic structure the $BaTiO_3$ configuring crystal grain G.

And as shown in FIG. 7, a plane in $BaTiO_3$ that is formed by Ba' is the (111) plane, and trap portion TP is thus inferred to be a plane defect of the (111) plane.

As has been described above, when a high electric field is applied to a dielectric layer of a multilayer ceramic capacitor, the multilayer ceramic capacitor tends to have insulation resistance dominated by grain boundaries of crystal grains forming the dielectric layer. Multilayer ceramic capacitor 100 according to the present disclosure can suppress variation in insulation resistance by taking Ni diffused from internal electrode layer 12 into crystal grain G by trap portion TP, and hence increase lifetime and the like in a high temperature load test in which a high electric field is applied to dielectric layer 11, and obtain high reliability.

In view of reliability of multilayer ceramic capacitor 100, crystal grain G having trap portion TP preferably has a plurality of trap portions TP in crystal grain G. Dielectric layer 11 preferably includes more crystal grains G having trap portion TP, and preferably includes more crystal grains G each having a plurality of trap portions TP.

While from this investigation trap portion TP in multilayer ceramic capacitor 100 is inferred to be a plane defect of the (111) plane, the plane defect of the (111) plane is an example of the trap portion TP in structure and is not exclusive. Furthermore, while an element that is trapped has been described with Ni as a target, Ni is an example of an element constituting the internal electrode layer and is not exclusive. Other examples of elements present locally in trap portion TP include Cu, Pt, Sn, Pd, Ag and the like. An element present locally in trap portion TP preferably includes at least one element selected from the group consisting of Ni, Cu, Pt, Sn, Pd and Ag. Trap portion TP according to the present disclosure has, for example, a structure capable of trapping an element diffused from the internal electrode layer.

While an element present locally in trap portion TP may be the same type of element as an element configuring the internal electrode layer, it is not necessarily an element diffused from the internal electrode layer. As will be described hereinafter, the multilayer ceramic capacitor having trap portion TP according to the present disclosure can also be obtained by using dielectric raw material powder including at least one element selected from the group consisting of Ni, Cu, Pt, Sn, Pd and Ag.

<Method for Manufacturing Multilayer Ceramic Capacitor>

Next, a method for manufacturing multilayer ceramic capacitor 100 showing an embodiment of the multilayer electronic component according to the present disclosure will be described in order of manufacturing steps. The method for manufacturing multilayer ceramic capacitor 100 includes the following steps.

The method for manufacturing multilayer ceramic capacitor 100 includes the step of obtaining a plurality of ceramic green sheets by using dielectric raw material powder. The word "green" is an expression representing "pre-sintered" and will be used in that meaning hereinafter. The dielectric raw material powder is, for example, $BaTiO_3$ powder having a surface with a variety of additives added thereto. The ceramic green sheet includes a binder component other than the dielectric raw material powder. The binder component is not particularly limited.

The above-described dielectric raw material powder can be produced, for example, by applying an organic compound of an additive to a surface of a $BaTiO_3$ powder, and calcinating and burning the organic component, to thereby bring about a state in which the additive is applied to the surface of the $BaTiO_3$ powder in an oxide state. However, the dielectric raw material powder is not limited to the above-described state, and may be in a state of including the organic compound, or in a state of including the oxide and the organic compound. The above-described $BaTiO_3$ powder in the dielectric raw material powder may be a $BaTiO_3$ solid solution powder.

In one embodiment, the method for manufacturing multilayer ceramic capacitor 100 includes the step of obtaining a plurality of ceramic green sheets by using dielectric raw material powder, wherein the dielectric raw material powder is dielectric raw material powder including at least one element selected from the group consisting of Ni, Cu, Pt, Sn, Pd and Ag. Using such dielectric raw material powder allows at least one element selected from the group consisting of Ni, Cu, Pt, Sn, Pd, and Ag to be present locally in trap portions of crystal grains constituting the dielectric layer. An example of $BaTiO_3$ powder that can be used to prepare dielectric raw material powder including at least one element selected from the group consisting of Ni, Cu, Pt, Sn, Pd and Ag is Ni-containing $BaTiO_3$ powder that can be prepared in the following method.

Initially, $BaTiO_3$ powder is coated with Ni through a plasma treatment to prepare Ni-coated $BaTiO_3$ powder. The Ni-coated $BaTiO_3$ powder is dispersed in a solution, Ba and Ti in the form of metal alkoxide are added thereto, and the intermediate product is hydrolyzed to provide a structure in which the coating of Ni is further coated with $BaTiO_3$. By using $BaTiO_3$ having such a structure, a multilayer ceramic capacitor including a dielectric layer composed of crystal grains having Ni trapped therein as a linear portion can be obtained.

The $BaTiO_3$ powder can be obtained, for example, by calcinating a mixture of a $BaCO_3$ powder and a $TiO_2$ powder. Alternatively, a $BaTiO_3$ powder made by a known method such as an oxalic acid method or a hydrothermal synthesis method may be used. Note that, as has been set forth above, a material that forms the dielectric layer is not limited to $BaTiO_3$, and it may for example be a material based on Ca, Ti or Zr.

The method for manufacturing multilayer ceramic capacitor 100 includes printing internal electrode layer patterns on the ceramic green sheets. A paste for internal electrode layers includes, for example, a Ni powder, a powder (co-material) containing a $BaTiO_3$ powder and a variety of additives applied to a surface thereof, and a binder component. Note that the co-material is not essential for the internal electrode layer. The binder component is not particularly limited. The printing internal electrode layer patterns on the ceramic green sheets corresponds to forming pre-sintered internal electrode layers on the pre-sintered dielectric layers using a paste for internal electrode layers.

The above-described co-material can be produced, for example, by applying an organic compound of an additive to a surface of a $BaTiO_3$ powder, and calcinating and burning the organic component, to thereby bring about a state in which the additive is applied to the surface of the $BaTiO_3$ powder in an oxide state. However, the co-material is not limited to the above-described state, and may be in a state of including the organic compound, or in a state of including the oxide and the organic compound. The above-described $BaTiO_3$ powder in the co-material may be a $BaTiO_3$ solid solution powder. The co-material may be the same as or different from the dielectric raw material powder.

The method for manufacturing multilayer ceramic capacitor 100 includes obtaining a green multilayer body by stacking the plurality of ceramic green sheets including the ceramic green sheets having the internal electrode patterns formed thereon.

The method for manufacturing multilayer ceramic capacitor 100 includes obtaining a multilayer body including a plurality of stacked dielectric layers and a plurality of internal electrode layers, by sintering the green multilayer body.

EXAMPLES

While the invention according to the present disclosure will be described more specifically below with reference to Examples and Comparative Examples, the invention according to the present disclosure is not limited to these examples.

Comparative Example 1

A multilayer ceramic capacitor was produced in accordance with the following procedure. First, a dielectric sheet and an electrically conductive paste for internal electrodes were prepared. The dielectric sheet and the electrically conductive paste for internal electrodes included an organic binder and a solvent. The dielectric sheet was produced using a dielectric raw material powder. The dielectric raw material powder includes $BaTiO_3$ powder.

The electrically conductive paste for internal electrodes was printed on the dielectric sheet in a predetermined pattern and an internal electrode pattern was formed on the dielectric sheet. The predetermined number of dielectric sheets for an outer layer having no internal electrode pattern printed thereon were stacked, and then, the dielectric sheet having the internal electrode pattern printed thereon was stacked on those dielectric sheets for an outer layer, and then, the predetermined number of dielectric sheets for an outer layer were stacked on that dielectric sheet. A multilayer sheet was thus produced. The multilayer sheet was pressed in a layer stacking direction by hydrostatic pressing, to thereby obtain a multilayer block. The multilayer block was cut into a predetermined size, to thereby obtain a multilayer chip. At this time, a corner portion and a ridge portion of the multilayer chip were rounded by barrel polishing. The multilayer chip was sintered, to thereby obtain a multilayer body. A sintering temperature was preferably 900 to 1300° C., depending on the materials of the dielectric layer and the internal electrode. In this comparative example as well, the sintering temperature was within this range. An electrically conductive paste for external electrodes was applied to both end surfaces of the multilayer chip and baked, and the baked layers of external electrodes were thus formed. A baking temperature was preferably 700 to 900° C. In this comparative example as well, the baking temperature was within this range. The surfaces of the baked layers were subjected to plating.

Example 1

(1) Preparing Dielectric Raw Material Powder 1

$BaTiO_3$ powder and metal Ni were simultaneously evaporated by plasma, and then cooled to form Ni-coated $BaTiO_3$ powder. An amount of Ni to be introduced was adjusted to provide the coating of Ni with a thickness of 2 nm. Dielectric raw material powder 1 was prepared in the same manner as in Comparative Example 1 except that this Ni coated $BaTiO_3$ powder was used.

A TEM was used to confirm 10 particles in cross section and their average thickness was taken as the thickness of the coating of Ni.

(2) Fabricating Multilayer Ceramic Capacitor

A multilayer ceramic capacitor was fabricated in the same manner as in Comparative Example 1 except that dielectric raw material powder 1 prepared according to item (1) above was used.

Example 2

(1) Preparing Dielectric Raw Material Powder 2

Dielectric raw material powder 2 was prepared in the same manner as in Example 1 except that the coating of Ni had a thickness of 5 nm.

(2) Fabricating Multilayer Ceramic Capacitor

A multilayer ceramic capacitor was fabricated in the same manner as in Comparative Example 1 except that dielectric raw material powder 2 prepared according to item (1) above was used.

Example 3

(1) Preparing Dielectric Raw Material Powder 3

Dielectric raw material powder 3 was prepared in the same manner as in Example 1 except that the coating of Ni had a thickness of 9 nm.

(2) Fabricating Multilayer Ceramic Capacitor

A multilayer ceramic capacitor was fabricated in the same manner as in Comparative Example 1 except that dielectric raw material powder 3 prepared according to item (1) above was used.

[Measurement and Evaluation]

(1) Measuring Fine Structure of Dielectric Layer

A sample was prepared from a multilayer ceramic capacitor through the above procedure, and had a center region subjected to observation with an HRTEM and elemental mapping through an EDX accompanying the HRTEM. An HRTEM observed image and an EDX elemental mapping image were provided at a magnification allowing 20 crystal grains to be accommodated within one field of view.

Table 1 shows how many crystal grains out of the 20 crystal grains in the field of view have a trap portion composed of Ni. Table 1 also shows how many crystal grains out of the 20 crystal grains in the field of view have two or more trap portions composed of Ni.

(2) Evaluation of Reliability

The multilayer ceramic capacitors were evaluated in reliability by the following two indexes based on the high temperature load test.

(2-1) Mean Time to Failure in Highly Accelerated Life Test (HALT Life)

A mean time to failure (MTTF) in a highly accelerated life test (HALT) in which 12 V was applied to the multilayer ceramic capacitor at 150° C. was measured. The result is shown in Table 1. The time when IR became equal to or less than $10^4$ was determined as a failure.

(2-2) Number of Failures after 2000 Hours in High Temperature Load Test

The number of failures (per 72 units) after 2000 hours in a typical high temperature load test in which a voltage of 6 V was applied to a multilayer ceramic capacitor at 85° C. was measured. A result thereof was shown in Table 1. A failure was determined for an IR falling to $10^4$ or below.

TABLE 1

|  | comparative example 1 | example 1 | example 2 | example. 3 |
|---|---|---|---|---|
| No. of crystal grains having trap portion | 0/20 | 1/20 | 4/20 | 13/20 |
| No. of crystal grains having two or more trap portions | 0/20 | 0/20 | 1/20 | 3/20 |
| HALT life (hours) | 8.3 | 10.5 | 13.1 | 21.3 |
| No. of failures | 5/72 | 0/72 | 0/72 | 0/72 |

In Comparative Example 1, the dielectric layer's crystal grains do not have the trap portion, resulting in a short HALT life and also a large number of failures after 2000 hours in the high temperature load test.

In each of Examples 1 to 3, in contrast, the dielectric layer's crystal grains have the trap portion with Ni present locally therein, and the multilayer ceramic capacitor is thus high in reliability. From the viewpoint of the reliability of the multilayer ceramic capacitor, the crystal grain having the trap portion preferably has a plurality of trap portions within the crystal grain. From the viewpoint of the reliability of the multilayer ceramic capacitor, the dielectric layer of the multilayer ceramic capacitor preferably has more crystal grains having a trap portion, and preferably has more crystal grains each having a plurality of trap portions.

The embodiment disclosed herein is illustrative and the invention according to the present disclosure is not limited to the above-described embodiment. That is, the scope of the invention according to the present disclosure is defined by the terms of the claims, and is intended to include any modifications within the scope and meaning equivalent to the terms of the claims. Various variations and modifications are also possible within the above-described scope.

For example, various variations and modifications are possible within the scope of the present invention, in terms for example of the number of layers of the dielectric layers and the internal electrode layers that form the multilayer body, and the materials of the dielectric layers and the internal electrode layers. Although the multilayer ceramic capacitor has been described as an example of the multilayer electronic component, the invention according to the present disclosure is not limited thereto and is also applicable to, for example, a capacitor element formed within a multilayer board.

What is claimed is:

1. A multilayer electronic component comprising:
   a plurality of stacked dielectric layers, each of the plurality of stacked dielectric layers having a plurality of crystal grains, at least some of the plurality of crystal grains having a trap portion therein, and at least one element selected from the group consisting of Ni, Cu, Pt, Sn, Pd and Ag is present locally in the trap portion; and
   a plurality of internal electrode layers arranged between adjacent dielectric layers of the plurality of stacked dielectric layers,
   wherein the trap portion includes a site in the crystal grain that has a crystallinity different from another part of the crystal grain, and
   wherein the site includes a linear plane defect in the crystal grain, the linear plane defect having a length of 20 nm or more in a longitudinal direction thereof, the trap portion configured to trap the at least one element.

2. The multilayer electronic component according to claim 1, wherein a plurality of trap portions are present in the at least some of the plurality of crystal grains.

3. The multilayer electronic component according to claim 1, wherein the at least one element is also included in the plurality of internal electrode layers.

4. The multilayer electronic component according to claim 1, wherein the plurality of dielectric layers include at least one element selected from the group consisting of Ba, Ti, Ca, Sr, and Zn.

5. The multilayer electronic component according to claim 2, wherein the plurality of trap portions are each a site in a crystal grain that has a crystallinity different from another part of the crystal grain.

6. The multilayer electronic component according to claim 2, wherein the plurality of trap portions each include the linear plane defect in the crystal grain.

7. The multilayer electronic component according to claim 6, wherein lines formed by an imaginary plane intersecting with the linear plane defects are parallel to one another.

8. The multilayer electronic component according to claim 1, wherein the plurality of internal electrode layers include at least one metal selected from Ni, Cu, Pt, Sn, Pd, and Ag, or an alloy including the at least one metal.

* * * * *